US009986258B2

(12) United States Patent
Bruls et al.

(10) Patent No.: US 9,986,258 B2
(45) Date of Patent: May 29, 2018

(54) EFFICIENT ENCODING OF MULTIPLE VIEWS

(75) Inventors: Wilhelmus Hendrikus Alfonsus Bruls, Eindhoven (NL); Christiaan Varekamp, Eindhoven (NL); Ralph Braspenning, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1611 days.

(21) Appl. No.: 12/294,515

(22) PCT Filed: Mar. 23, 2007

(86) PCT No.: PCT/IB2007/051031
§ 371 (c)(1),
(2), (4) Date: Sep. 25, 2008

(87) PCT Pub. No.: WO2007/113725
PCT Pub. Date: Oct. 11, 2007

(65) Prior Publication Data
US 2010/0231689 A1    Sep. 16, 2010

(30) Foreign Application Priority Data
Mar. 31, 2006   (EP) .................................. 06112096

(51) Int. Cl.
*H04N 13/00*    (2006.01)
*H04N 19/597*   (2014.01)
*H04N 19/00*    (2014.01)

(52) U.S. Cl.
CPC ....... *H04N 19/597* (2014.11); *H04N 13/0022* (2013.01); *H04N 19/00* (2013.01); *H04N 2213/005* (2013.01)

(58) Field of Classification Search
CPC ................. H04N 7/26; H04N 13/0022; H04N 19/00769; H04N 2213/005; H04N 19/597; H04N 19/00
(Continued)

(56) References Cited

U.S. PATENT DOCUMENTS 6,163,337 A    12/2000  Azuma et al.
6,175,652 B1 *  1/2001  Jacobson et al. ............. 382/216
(Continued)

FOREIGN PATENT DOCUMENTS

EP    1313329 A2    5/2003
JP    61144191 A    7/1986
(Continued)

OTHER PUBLICATIONS

Redert A et al: "ATTEST: Advanced three-dimensional television system technologies" 3D Data Processing Visualization and Transmission, 2002. Proceedings. First International Symposium on June 19-21, 2002, Piscataway, NJ, USA,IEEE, Jun. 19, 2002 pp. 313-319, XP010596672, ISBN: 0-7695-1521-4.
Christoph Fehn et al: "Study of some MPEG Tools Related to 3D-Video" ISO MPEG, Document M8423, Apr. 30, 2002, pp. 1-5, XP030037386.
(Continued)

*Primary Examiner* — Kenneth R Coulter

(57) ABSTRACT

A new method of encoding multiple view image information into an image signal including adding to the image signal a first image of pixel values representing one or more objects captured by a first camera; adding to the image signal a map comprising for respective sets of pixels of the first image respective values, representing a three-dimensional position in space of a region of the one or more objects represented by the respective set of pixels, and adding to the image signal a partial representation of a second image of pixel values representing one or more objects captured by a second camera, the partial representation including at least information of the majority of the pixels representing
(Continued)

regions of the one or more objects not visible to the first camera.

19 Claims, 4 Drawing Sheets

(58) Field of Classification Search
USPC .................................................. 348/43, 46–48
See application file for complete search history.

(56) References Cited

U.S. PATENT DOCUMENTS

| 6,903,735 | B2* | 6/2005 | Jeong et al. .................. 345/418 |
| 7,512,250 | B2* | 3/2009 | Lim et al. ..................... 382/103 |
| 2003/0095119 | A1* | 5/2003 | Jeong et al. .................. 345/419 |
| 2004/0101043 | A1 | 5/2004 | Flack et al. |
| 2006/0204077 | A1* | 9/2006 | Lim et al. ..................... 382/154 |
| 2012/0019612 | A1* | 1/2012 | Choudury ....................... 348/36 |

FOREIGN PATENT DOCUMENTS

| JP | 6265322 | A | 9/1994 |
| JP | 6319157 | A | 11/1994 |
| JP | 7015748 | A | 1/1995 |
| JP | 9009294 | A | 1/1997 |
| JP | 9027969 | A | 1/1997 |
| JP | 10191396 | A | 7/1998 |
| WO | 02097733 | A2 | 12/2002 |
| WO | 2004059980 | A1 | 7/2004 |

OTHER PUBLICATIONS

C. Fehn, et al: "An Evolutionary and Optimised Approach on 3D-TV" Proceedings of International Broadcast Conference, (IBC 2002), [Online] pp. 357-365, XP002464365.

P. Kauff, et al: "Data Format and Coding for Free Viewpoint Video" Proceedings of International Broadcast Conference (IBC 2005), [Online] Sep. 2005, pp. 1-8 XP002464366.

F. Bruls et al: "Proposal to amendment MPEG-C Part 3" ISO MPEG, Document M14700, Jul. 2007, pp. 1-7, XP002464367.

F. Bruls et al: "Additional requirements for stereoscopic video in MPEG-C part 3" ISO MPEG, Document M14699, Jul. 2007, pp. 1-2, XP002464368.

W. Yang, et al: An MPEG-4-Compatible Stereoscopic-Multiview Video Coding Scheme, IEEE Transactions on Circuits and Systems for Video Technology, Vol. 16, No. 2, February 2006, pp. 1-5.

Andra et al: "Combination of Optically Measured Coordinates and Displacements for Quantitative Investigation of Complex Objects"; Proceedings of the SPIE—The International Society for Optical Engineering, 1996, vol. 2782, pp. 200-210.

Ernst et al: "Efficient Generation of 3-D Models Out of Depth Maps"; Vision, Modeling, and Visualization, 2001, pp. 203-210.

Op De Beeck et al: "Towards an Optimized 3D Broadcast Chain"; Proceedings of the SPIE, 2002, pp. 1-9.

Ernst et al: "Dense Structure-From-Motion: An Approach Based on Segment Matching"; Vision-ECCV 2002, LCNS, vol. 2351, pp. 217-231.

Braspenning et al: "Efficient View Synthesis From Uncalibrated Stereo"; SPIE 6055, Jan. 2006, 11 page Document.

* cited by examiner

EFFICIENT ENCODING OF MULTIPLE VIEWS

BACKGROUND

The invention relates to a method of encoding multiple views of an image into an image signal, such as for example a compressed television signal according to one of the MPEG standards.

The invention also relates to: an apparatus for generating such a signal, a receiver for receiving such a signal, a method of extracting the encoded information from the signal, so that it can be used for generating the multiple views, and the efficiently encoded signal itself.

There is currently work going on in the standardization of three-dimensional image information encoding. There are several ways of representing a three-dimensional object, for example as a set of voxels (popular e.g. in medical data display or industrial component inspection), or as a number of view images captured from different directions and intended to be viewed from different directions, for example by the two eyes of a single viewer or by multiple viewers, or a moving viewer, etc.

A popular format is the left/right format, in which a picture is captured by a camera on the left and a picture is captured by camera on the right. These pictures may be displayed on different displays, for example the left picture may be shown during a first set of time instances, and the right picture during an interleaved second set of time instances, the left and right eyes of the viewer being blocked synchronously with the displaying by shutter glasses. A projector with polarization means is another example of a display capable of generating a three-dimensional impression of a scene, at least render some of the three-dimensional information of the scene, namely what it approximately looks like in a certain direction (namely stereo).

Different qualities of approximation of the scene may be employed, e.g. the 3D scene may be represented as a set of flat layers behind each other. But these different qualities can be encoded by the existing formats.

Another popular display is the autostereoscopic display. This display is formed for example by placing an LCD behind a set of lenses, so that a group of pixels is projected to a region in space by a respective lens. In this way a number of cones is generated in space which two by two contain left and right images for a left and right eye, so that without glasses a user can position himself in a number of regions in space, and perceive 3D. However the data for these groups of pixels has to be generated from the left and right images. Another option is that a user can see an object from a number of intermediate directions between the left and right view of the stereo encoding, which intermediate views can be generated by calculating a disparity field between the left and the right picture, and subsequently interpolating.

It is a disadvantage of the prior art left/right encoding that considerable data is required to obtain the intermediate views, and that still somewhat disappointing results may be obtained. It is difficult to calculate a precisely matching disparity field, which will lead to artifacts in the interpolations, such as parts of a background sticking to a foreground object. A desire which led to the here below presented technological embodiments was to have an encoding way which can lead to relatively accurate results when converting to different formats, such as to a set of views with intermediate views, yet which does not comprise an undue amount of data.

Such requirements are at least partially fulfilled by a method of encoding multiple view image information into an image signal (200) comprising:
adding to the image signal (200) a first image (220) of pixel values representing one or more objects (110, 112) captured by a first camera (101);
adding to the image signal (200) a map (222) comprising for respective sets of pixels of the first image (220) respective values representing a three-dimensional position in space of a region of the one or more objects (110, 112) represented by the respective set of pixels; and
adding to the image signal (200) a partial representation (223) of a second image (224) of pixel values representing the one or more objects (110, 112) captured by a second camera (102), the partial representation (223) comprising at least the majority of the pixels representing regions of the one or more objects (110, 112) not visible to the first camera (101),
and a signal obtained by the method or an apparatus allowing the performance of the method.

The inventors have realized that if one understands that for quality reasons it is best to add to the left and right images a map containing information on the three-dimensional structure of the scene, representing at least this part of the three-dimensional scene information which is required for enabling the particular application (with the desired quality), an interesting encoding format may be conceived. For view interpolation, the map may be e.g. an accurately segmented disparity map, the disparity vectors of which will lead to a good interpolation of intermediate views. It is important to notice that this map can be tuned optimally on the creation/transmission side according to its use on the receiving side, i.e. e.g. according to how the three-dimensional environment will be simulated on the display, which means that it will typically have different properties than when it would be used to optimally predict regions of pixels in the left and right view.

The map may e.g. be fine-tuned, or even created, by a human operator, who may preview at his side how a number of intended displays would behave when receiving the signal. Nowadays, and in the future even more so, a part of the content is already computer-generated, such as e.g. a three-dimensional model of a dinosaur, or overlay graphics, which means that it is not too problematic to create at least for regions containing such man-made objects pixel accurate disparity maps, or depth maps, or similar maps.

This is certainly true for game applications, in which e.g. a user can move slightly compared to the scene, and may want to see the scene differently, but in the near future the invention may also become important for 3D television, captured with two cameras, or even generated on the basis of e.g. motion parallax. Already an increasing number of studios (e.g. for the BBC) are using e.g. virtual surroundings for the news.

This map may be encoded with little data overhead, e.g. as a grey values image, compressed according to the MPEG-2 standard, and appended to the left/right image (or images for several time instants for moving video) already in the signal.

Having this map, however the inventors realized, allows a further reduction of the amount of data, because a part of the scene is imaged by both cameras. Although the pixel information may be useful for bi-directional interpolation (e.g. specular reflections towards one of the cameras may be mitigated), in fact not so much important information will be present in the doubly coded parts. Therefore, having available the map, it can be determined which parts of the second image (e.g. the right image) need to be encoded (and transmitted), and which parts are less relevant for the particular application. And on the receiving side a good quality reconstruction of the missing data can be realized.

E.g., in a simple scene approximation (capturing), with an object with an essentially flat face towards the cameras (which may be positioned parallel or under a small angle towards the scene), and not too closeby, the missing part in the first (left) image which is captured in the second (right) image consists of pixels of a background object (e.g. the elements of the scene at infinity).

An interesting embodiment involves the encoding of a partial second disparity or depth map, or similar. This partial e.g. depth map will substantially contain depth values of the region that could not be imaged by the first camera. From this depth data it can then be inferred on the receiving side which uncovered part belongs to a foreground object having a first depth (indicated by 130 in FIG. 1), and which part belongs to the background (132). This may allow better interpolation strategies, e.g. the amount of stretching and filling of holes may be fine-tuned, a pseudo-perspective rendering of an ear may be rendered in the intermediate image instead of just background pixels, etc. Another example is that the trapezium distortion of angled cameras may be encoded in this second map for receiver side compensation.

In case of trapezium deformation from capturing with (typically slightly) converging cameras, there will in general be a vertical disparity in addition to a horizontal one. This vertical component can be encoded vectorially, or in a second map, as already envisioned e.g. in the "auxiliary data representation" proposals of the MPEG-4 subgroup Video-3DAV (e.g. ISO/IEC JTC1/SC29/WG11 Docs. MPEG2005/ 12603, 12602, 12600, 12595). The components of the disparity can be mapped to the luma and/or chrominance of an auxiliary picture, e.g. the horizontal disparity can be mapped high resolution to the luma, and the vertical disparities can be mapped with a scheme to one or two chrominance components (so that some of the data is in the U and by a mathematical split as much of the additional data in the V).

Advantages of a partial left+right+"depth" format over e.g. first encoding to a center view+"depth"+bisidal occlusion data are the following. Transforming occlusion data to the center view—instead of storing it on an original camera capturing view, leads to processing inaccuracies (in particular if the depth map(s) is of automatically derived and of lower quality/consistency, having temporal and spatial imperfections), and hence coding inefficiency. Also when calculation an intermediate view further inaccuracies will come on top of this.

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concept, and in which dashes are used to indicate that a component is optional, non-dashed components not necessarily being essential.

DETAILED DESCRIPTION

Figure 1:
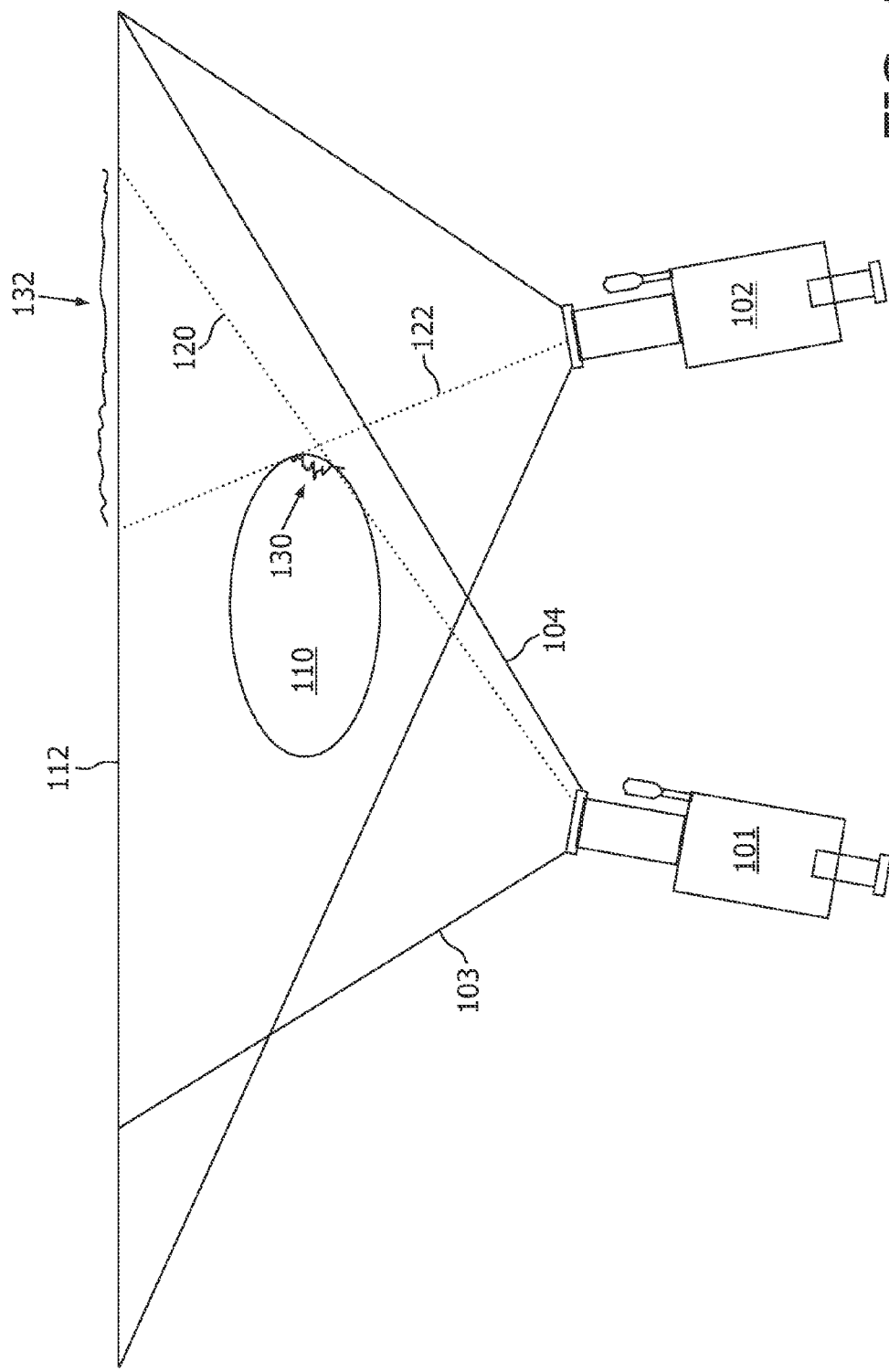
FIG. 1 schematically illustrates the capturing of a scene with at least two cameras.

FIG. 1 shows a first camera 101 capturing a first image of a scene comprising a nearer object 110 and a further away object 112. Its field of view is delimited by lines 103 and 104. Its view of the background is occluded by the nearer object, namely the region 132 on the left side of tangent 120 is not visible. A second camera 102 is however capable of capturing a part of this region 132, in a second image, which can for simplicity reasons be considered to be, and called the right image (but this should not be interpreted narrower than that it was captured somewhat more to the right of the other picture). The second camera is also capable of capturing a further part 130 of the nearer object 110.

Figure 2:
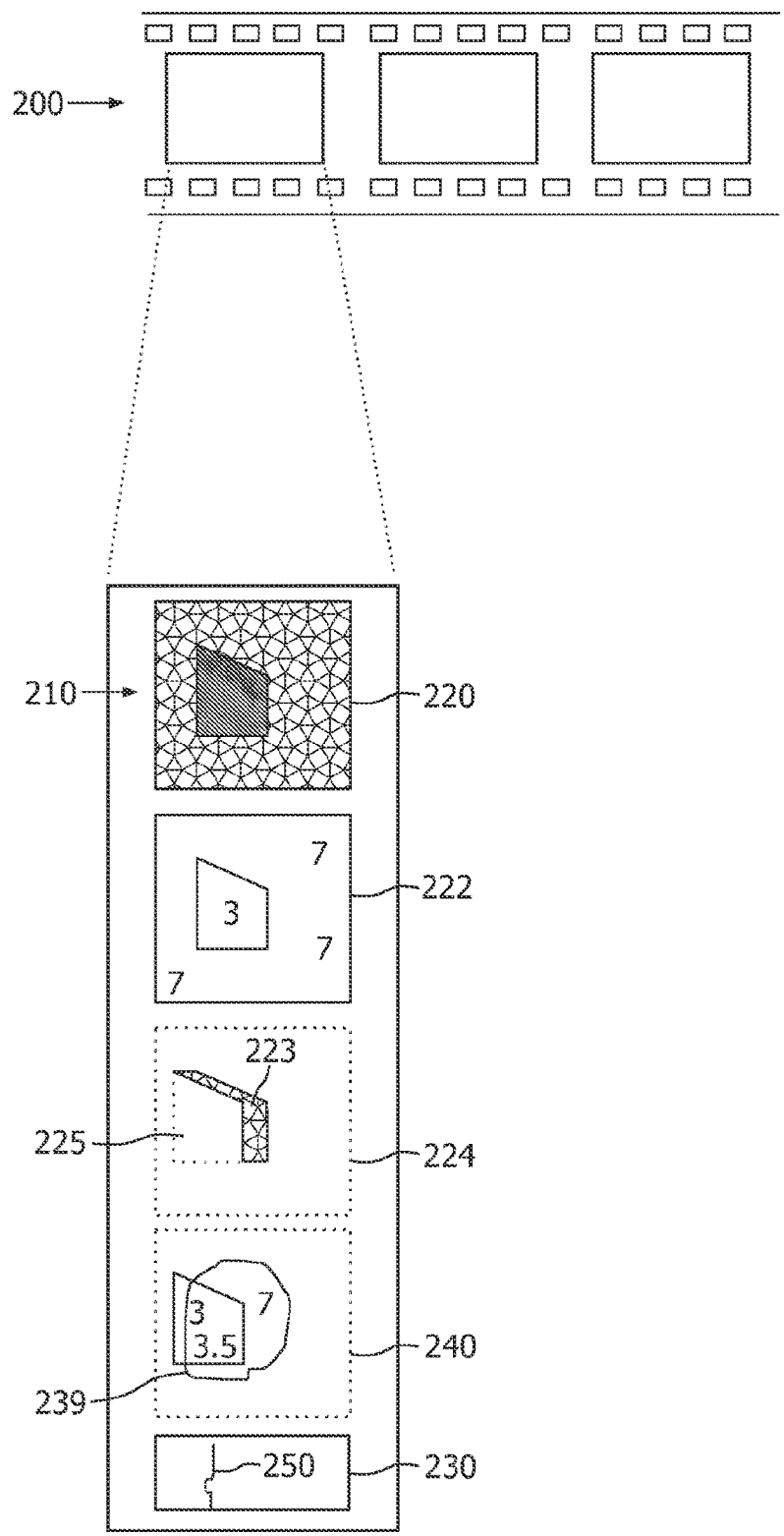
FIG. 2 schematically illustrates several options of the encoding the required data in the image signal.

FIG. 2 symbolically shows what these captured images will look like as a set of pixels. Image signal 200 may for example have a prescribed encoding format of JPEG and contain an encoded photograph of the scene, or may be an MPEG-4 encoded movie shot. In the latter case the 3D data 210 comprises the required information for reconstructing the scene at a particular temporal instant.

Image 220 is the left image captured by the first camera, comprising a nearer object 110 and a background 112.

Map 222 is a map comprising any information relating to how the objects are positioned in their three-dimensional space, comprising at least that information required for the rendering of a number of required views (statically or dynamically, e.g. in an interaction with a moving user in a game) on a display. Several such representations are possible, e.g. it may be a depth map, comprising e.g. an orthogonal approximate (e.g. average over all object regions) distance to the center of the camera of the object in the background, in their two-dimensional positions as perceived by the first camera, or it may be a disparity or parallax, or only a horizontal component of the disparity.

Depth and parallax etc. can be related to each other mathematically.

This depth map may e.g. be pixel accurate or may have a single value for each 8×8 block of pixels, and may be encoded e.g. as an image.

Further information may be added to the depth map (which may comprise scalars or tuples per set of pixels, a set possibly including only a single pixel), such as e.g. accuracy data (on how reliable a certain part of the depth map is) determined on the basis of the matching algorithm for deriving it.

Partial data structure 223 (a part of the right image 224) comprises information of the pixels (e.g. luminance only, or color, or any other customary representation, such as e.g. a texture model, capable of generating pixels in a region) of the background which can be seen only by the second camera (adjacent to the parallax-shifted nearer object 225). This encoded partial region—or at least the data required for obtaining pixel values in a part of a larger encoded region shape according to an image patch generation algorithm— may be somewhat smaller than the actual de-occluded region captured in the right image, in case the receiver side application can tolerate some missing pixels, e.g. by generating them with a simple extrapolation, stretching, etc.

The encoded region may also be larger (e.g. up to double the width and a similar buffer size appended in the vertical direction). This may be interesting e.g. in case of uncertainty about the exactness of the shape when automatically derived, or in case for some reason bi-directional interpolation is desirable.

It may also be for encoding reasons. It may be cheaper to encode entire blocks, and one can profit from the extra-encoded pixels, whereas complex shape encoding may be expensive. Thereto at the transmitting side, a manual or (semi-) automatic analysis may be done on the data in the right image, which is proposed as output of a prior derivation stage to be useful in addition to the data in the left image. E.g. one may look at the pixel properties to identify a specular reflection, and decide to code a region of pixels comprising the reflection in both images.

Also the shape of difference regions may be analyzed by morphological analysis, in particular the size or width of the region may be determined. Small regions may involve considerable coding overhead, but may often be approximated on the receiver side with no or little information. Therefore, small regions may be omitted from the partial second picture. This may be under the control of a human operator, who checks the effect of each deletion.

The (encompassing or exact) shape of the region may e.g. be encoded with polygonal approximation or a bounding box, and the interior pixel (texture) values may be encoded directly, or by coefficients of a linear transformation representation over the shape, or other mathematical model. Also, vice versa the parts which need not be encoded/transmitted may be indicated.

The partial representation may be mapped (e.g. a simple offset in blanking lines, a morphing, or a cutting up into sub-blocks which are restacked according to a predetermined order) onto image or user data (e.g. a regeneration model) not used for the first image.

If the first image with accompanying depth map is a center image, there may be partial second images for either side, i.e. at a certain angular distance (base-line) between which can be interpolated.

The first camera may be imaging a background and the second camera may be imaging the background with e.g. a newsreader covering part of it, e.g. from the same view point at a different time. I.e. the cameras need not be actual cameras present simultaneously at a certain time, but rather e.g. one of the views may e.g. be downloaded from a picture storage.

Optionally, at least for the part around the imaged uncovered object regions in the second image a second depth map 239 (part of the full depth map 240), or similar representation may be added to the signal. This depth map may comprise a boundary between a nearby and faraway object. With this information, the receiving side can append during interpolation the different pixels to the correct objects/depth layers.

Further data 230 may also be added to the signal—e.g. in proprietary fields—such as information on the separation or in general three-dimensional composition of objects in the scene. The indication may be as simple as a line following an imaged scene object boundary (if e.g. the depth map is not sufficient or accurate enough to by itself demarcate the objects), or even something as complicated as a wiremesh (e.g. of the local depth structure in the de-occluded parts) or information derived there from.

Also camera position information and scene range information may be included, allowing the receiving side to do more advanced reconstructions of the multiple (at least two) views.

Figure 3:
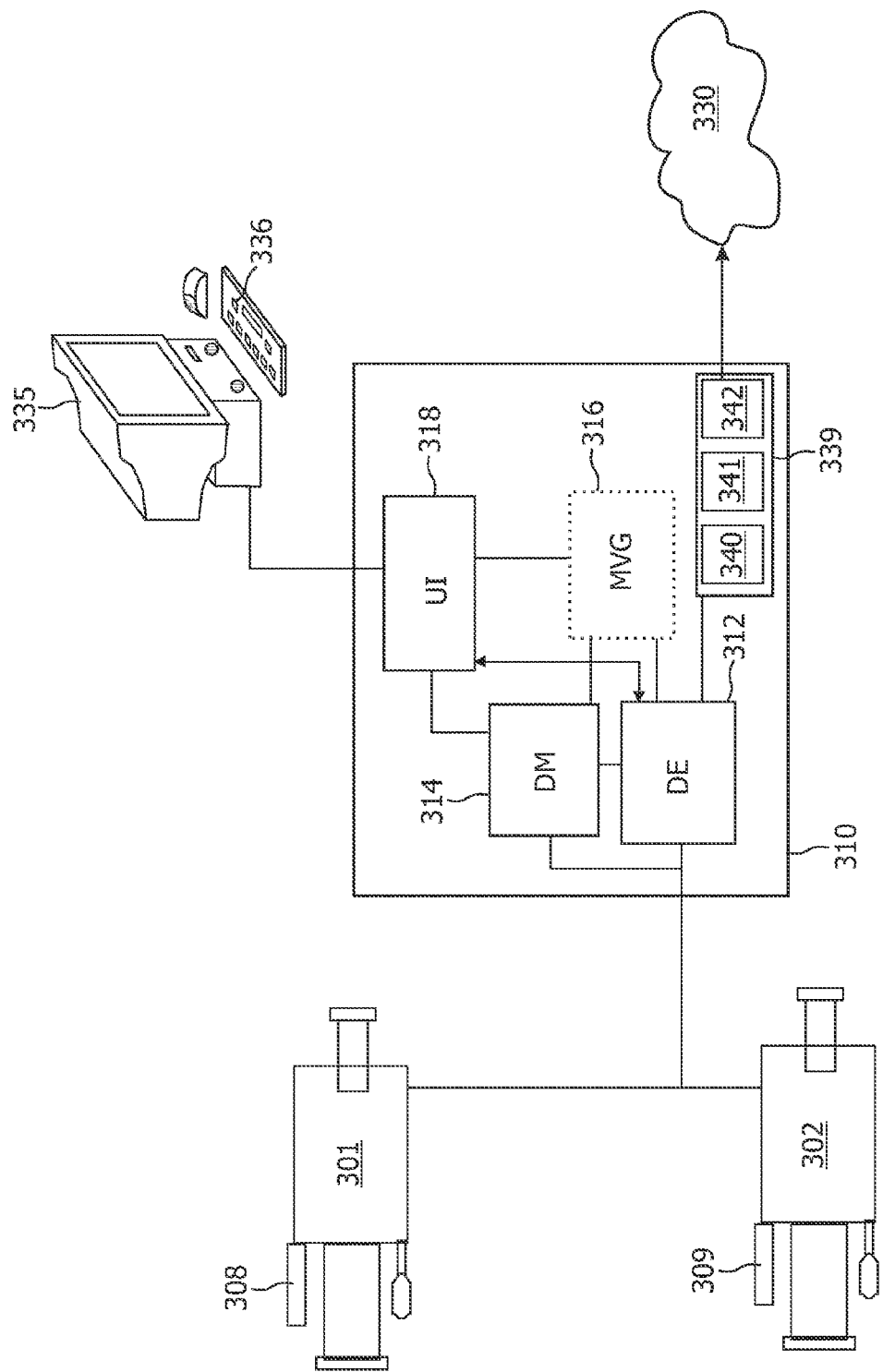
FIG. 3 schematically illustrates an exemplary apparatus for generating the image signal.

FIG. 3 shows an apparatus 310 for generating the image signal. It will typically be an IC or part of an IC, or a processor with appropriate software. The apparatus may be comprised in a larger apparatus such as a dedicated authoring apparatus in a studio, and may be attached to a computer, or may be comprised in a computer. In the exemplary embodiment, a first camera 301 and a second camera 302 are connected to the input of the apparatus 310. Each camera has a range finder (308 resp. 309), which may use for example a laser beam or a projected grid, etc.

In the apparatus there is disparity estimation unit 312 which is arranged to determine disparities between at least two pictures, at least by taking object geometry into account (by using information in the depth map). Different disparity estimation techniques are known from the prior art, e.g. by means of a sum of absolute differences of pixel values in related blocks.

It is arranged to determine at least which regions are present in only one of the images and which are present in both, but it may additionally have units which are able to apply matching criteria to regions of pixels.

There may also be a depth map unit 314 capable of generating and/or Analyzing and/or refining depth maps (or a similar representation like a disparity map) either determined by the disparity estimation unit 312, or extracted from the inputted camera signal containing for example range data. There may optionally be comprised a rendering unit 316, which may generate for example intermediate views so that a studio artist can check the impact of any modification and/or more efficient coding. This is done via user interface unit 318, which may allow e.g. the user to change values in the partial representation 223, or change its shape (e.g. make it larger or smaller). The user may also modify the map 222. Thereto a display 335 and user input means are connectable. The apparatus is capable of transmitting the finally composed image signal to a network 330 via signal transmission and composition means 339, which the skilled person can find for the appropriate network (e.g. conversion to a television signal involves upconversion to a transmission frequency, internet transmission involves packetization, there may further be error protection units etc.).

The feature network should not be interpreted to limitative, and is intended to comprise also i.e. transmission to a memory unit or storage medium via an apparatus internal network such as a bus.

Figure 4:
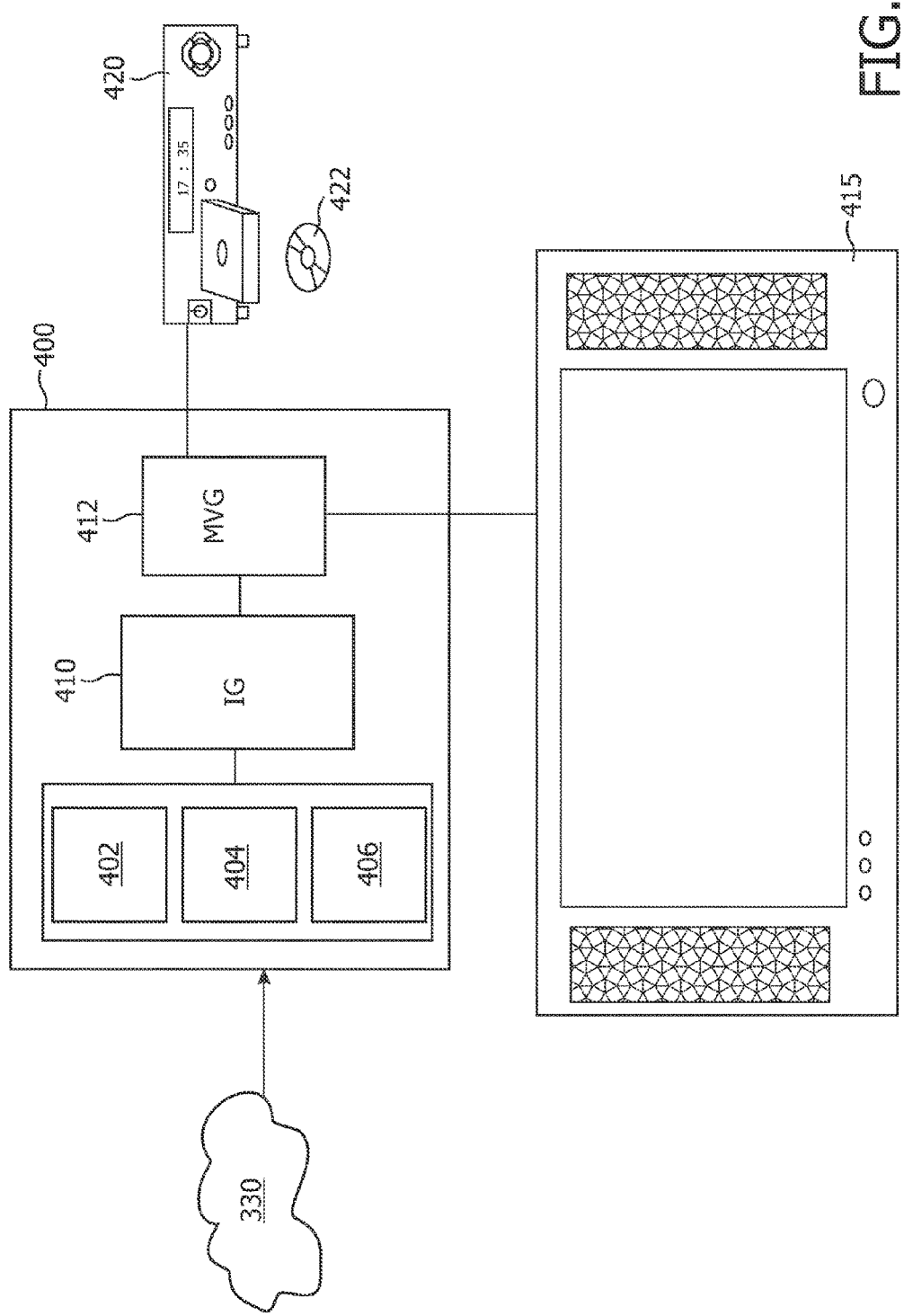
FIG. 4 schematically illustrates an exemplary receiving apparatus capable of using the signal.

FIG. 4 shows an exemplary receiver 400, which may again be e.g. (part of) an IC, and which comprises means for extracting the relevant information from the image signal receivable from the network 330, at least:

means (402) arranged to extract the first image (220) of pixel values representing one or more objects (110, 112) captured by a first camera (101);

means (404) arranged to extract from the image signal (200) the map, e.g. a depth map corresponding to the object positions of the first image; and means (406) arranged to extract the partial representation (223) of the second image (224) of pixel values representing the one or more objects (110, 112) captured by a second camera (102).

Of course further means may be present, since the receiver (and method of extraction) may mirror any of the embodiments possible for the generation, so there may be e.g. a means to extract the further data, such as the indication of the border between two objects.

This extracted information is transmitted to an image regenerator, which can generate e.g. a full left and right image. An image-rendering unit 412 may generate e.g. intermediate view (e.g. by mono- or bi-directional interpolation, or any other known algorithm), or the signals required for two view (stereo) on an autostereoscopic display. Depending on the kind of 3D display and how the 3D is actually represented, these two units may be realized in different combinations.

The receiver may typically be connectable to or comprised in a 3D display 415, which can render at least two views, or the regenerated signal(s) may be stored in a memory device 420, e.g. a disk 422 writer, or on solid state memory, etc.

The algorithmic components disclosed in this text may in practice be (entirely or in part) realized as hardware (e.g. parts of an application specific IC) or as software running on a special digital signal processor, or a generic processor, etc.

Under computer program product should be understood any physical realization of a collection of commands enabling a processor—generic or special purpose—, after a series of loading steps (which may include intermediate conversion steps, like translation to an intermediate language, and a final processor language) to get the commands into the processor, to execute any of the characteristic functions of an invention. In particular, the computer program product may be realized as data on a carrier such as e.g. a disk or tape, data present in a memory, data traveling over a network connection—wired or wireless—, or program code on paper. Apart from program code, characteristic data required for the program may also be embodied as a computer program product.

Some of the steps required for the working of the method may be already present in the functionality of the processor instead of described in the computer program product, such as data input and output steps.

It should be noted that the above-mentioned embodiments illustrate rather than limit the invention. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements.

The invention claimed is:

1. A non-transitory memory medium having processor readable program code for operating on a processor for performing a method of encoding multiple view image information into an image signal, the method comprising acts of:
   the processor
   adding to the image signal a first image of pixel values representing one or more objects captured by a first camera;
   adding to the image signal a map comprising for respective sets of pixels of the first image respective values, representing a three-dimensional position in space of a region of the one or more objects represented by the respective set of pixels;
   adding to the image signal a partial representation of a second image of pixel values representing one or more objects captured by a second camera, the partial representation mostly comprising at least information of a substantial majority of the pixels representing regions of the one or more objects not visible to the first camera, the partial representation not including a substantial majority of portions of the second image visible to the first camera; and
   transmitting the image signal to at least one of a storage device and a receiver, wherein the transmitted image signal includes the first image of pixel values, the map and the partial representation of the second image of pixel values.

2. The medium as claimed in claim 1, the method further comprising an act of adding to the image signal a second map comprising at least a partial representation of, for respective sets of pixels of the second image, respective values representing a three-dimensional position in space of a region of the one or more objects represented by the respective set of pixels.

3. The medium as claimed in claim 1, the method further comprising an act of automatically deriving by means of a disparity calculation algorithm for sets of pixels in the first image disparity vectors pointing to corresponding sets of pixels in the second image, and the act of adding to the image signal a map, consisting of adding the map comprising the disparity vectors.

4. The medium as claimed in claim 1, the method further comprising an act of obtaining from a range determination device respective ranges for sets of pixels in the first image, and the act of adding to the image signal a map comprising an act of adding the map including the ranges.

5. The medium as claimed in claim 1, the method further comprising an act of adjusting manually the values of the map prior to the adding to the image signal.

6. The medium as claimed in claim 1, the method further comprising an act of adjusting manually the partial representation prior to the adding to the image signal.

7. The medium as claimed in claim 2, the method further comprising an act of adding to the image signal an indication of positions in the map indicating a boundary between a first object and a second object.

8. The medium as claimed in claim 1, wherein the act of adding to the image signal the partial representation of the second image comprises acts of specifying and adding to the image signal a representation of an encompassing shape encompassing the region of pixels in the partial representation of the second image.

9. The medium as claimed in claim 1, wherein the act of adding to the image signal the partial representation of the second image comprises an act of specifying regions of the second image which are not encoded in the partial representation.

10. The medium as claimed in claim 1, the method further comprising acts of:
    performing a morphological analysis on regions comprised in the partial representation of the second image, and
    modifying the partial representation based on the morphological analysis prior to adding the partial representation to the image signal, the morphological analysis comprising an act of making a determination of the largest width of the respective regions.

11. An apparatus for generating an encoding into an image signal of multiple view image information, the apparatus comprising:
    a processor; and
    a memory with instructions executable by the processor;

the instructions when executed by the processor performing acts of:
adding to the image signal a first image of pixel values representing one or more objects captured by a first camera;
adding to the image signal a map comprising for respective sets of pixels of the first image respective values representing a three-dimensional position in space of a region of the one or more objects represented by the respective set of pixels;
adding to the image signal a partial representation of a second image of pixel values representing one or more objects captured by a second camera, the partial representation mostly comprising at least information of a substantial majority of the pixels representing regions of the one or more objects not visible to the first camera, the partial representation not including a substantial majority of portions of the second image visible to the first camera; and
transmitting the image signal to at least one of a storage device and a receiver, wherein the transmitted image signal includes the first image of pixel values, the map and the partial representation of the second image of pixel values.

12. The apparatus as claimed in claim 11, the instructions when executed by the processor performing a further act of adding to the image signal an indication of positions in the map indicating a boundary between a first object and a second object.

13. The apparatus as claimed in claim 11, the instructions when executed by the processor performing a further act of providing a user interface unit arranged to give a human operator control over at least one of the contents of the map and the partial representation.

14. An image signal receiver, comprising:
a processor; and
a memory with instructions executable by the processor;
the instructions when executed by the processor performing acts of:
extracting from an image signal a first image of pixel values representing one or more objects captured by a first camera;
extracting from the image signal a map comprising for respective sets of pixels of the first image respective values representing a three-dimensional position in space of a region of the one or more objects represented by the respective set of pixels;
extracting from the image signal a partial representation of a second image of pixel values representing one or more objects captured by a second camera, the partial representation mostly comprising at least information of a substantial majority of the pixels representing regions of the one or more objects not visible to the first camera, the partial representation not including a substantial majority of portions of the second image visible to the first camera; and
transmitting the image signal to at least one of a storage device and an image rendering device, wherein the transmitted image signal includes the first image of pixel values, the map and the partial representation of the second image of pixel values.

15. A display capable of generating at least two views of an image comprising:
the image signal receiver as claimed in claim 14, comprising:
a display configured to generate at least two views of an image,
the instructions when executed by the processor performing further acts of:
generating two images from the image signal data received by the image signal receiver; and
generating from the two images further images of a format appropriate for the display.

16. A non-transitory memory medium having processor readable program code for operating on a processor for performing a method of extracting multiple view image information from an image signal, the method comprising acts of:
the processor
extracting from the image signal a first image of pixel values representing one or more objects captured by a first camera;
extracting from the image signal a map comprising for respective sets of pixels of the first image respective values representing a three-dimensional position in space of a region of the one or more objects represented by the respective set of pixels;
extracting from the image signal a partial representation of a second image of pixel values representing one or more objects captured by a second camera, the partial representation mostly comprising at least information of a substantial majority of the pixels representing regions of the one or more objects not visible to the first camera, the partial representation not including a substantial majority of portions of the second image visible to the first camera; and
transmitting the image signal to at least one of a storage device and an image rendering device, wherein the transmitted image signal includes the first image of pixel values, the map and the partial representation of the second image of pixel values.

17. A non-transitory memory medium having a processor readable image signal readable by a processor configured to extract the image signal from the medium to display signals required for stereo view on an autostereoscopic display, the image signal comprising:
a first image of pixel values representing one or more objects captured by a first camera;
a map comprising for respective sets of pixels of the first image respective values representing a three-dimensional position in space of a region of the one or more objects represented by the respective set of pixels; and
a partial representation of a second image of pixel values representing one or more objects captured by a second camera, the partial representation mostly comprising at least information of a substantial majority of the pixels representing regions of the one or more objects not visible to the first camera, the partial representation not including a substantial majority of portions of the second image visible to the first camera.

18. The medium as claimed in claim 17, the partial representation comprising an indication of positions in the map indicating a boundary between a first object and a second object.

19. The medium as claimed in claim 17, wherein the partial representation is mapped onto image or user data relating to but not used for the first image.

* * * * *